United States Patent [19]
Ball et al.

[11] Patent Number: 5,666,372
[45] Date of Patent: Sep. 9, 1997

[54] EMBEDDED BRAGG GRATING LASER MASTER-OSCILLATOR AND POWER-AMPLIFIER

[75] Inventors: Gary A. Ball, Simsbury; William H. Glenn, Vernon, both of Conn.

[73] Assignee: United Technologies Corporation, Hartford, Conn.

[21] Appl. No.: 13,490

[22] Filed: Feb. 1, 1993

Related U.S. Application Data

[63] Continuation-in-part of Ser. No. 732,552, Jul. 19, 1991, which is a continuation-in-part of Ser. No. 457,118, Dec. 26, 1989, abandoned.

[51] Int. Cl.$^6$ ........................................... H01S 3/30
[52] U.S. Cl. ................... 372/6; 372/92; 372/102
[58] Field of Search ...................... 372/6, 102, 92, 372/98

[56] References Cited

U.S. PATENT DOCUMENTS

| | | | |
|---|---|---|---|
| 5,103,456 | 4/1992 | Scifres et al. | 372/102 |
| 5,237,576 | 8/1993 | DiGiovanni et al. | 372/6 |
| 5,305,335 | 4/1994 | Ball et al. | 372/102 |
| 5,317,576 | 5/1994 | Leonberger | 372/6 |
| 5,357,273 | 10/1994 | Farries et al. | 372/102 |
| 5,422,897 | 6/1995 | Wyatt et al. | 372/102 |
| 5,473,622 | 12/1995 | Grubb | 372/102 |

*Primary Examiner*—Leon Scott, Jr.

[57] ABSTRACT

An emedded Bragg grating laser Master-Oscillator and Power-Amplifier (MOPA), includes an optical waveguide which receives and propagates pump light of a predetermined wavelength launched into the optical waveguide; a first master oscillator laser, disposed in the waveguide in the path of the pump light, the laser having a laser cavity disposed between a first pair of reflectors and having a first laser gain medium within the first laser cavity which emits first lasing light in response to the pump light, the first reflectors reflecting a predetermined amount of the first lasing light within the first laser cavity and passing a predetermined amount of the first fusing light as first output laser light from the first laser, the first reflectors passing the pump light through the first laser; at least one of the first reflectors comprises a Bragg grating; and an optical waveguide power amplifier, disposed in the path of the first output laser light and the pump light, and having a first amplifier gain medium therein which emits first amplified laser light in response to the pump light and the first output laser light.

9 Claims, 1 Drawing Sheet

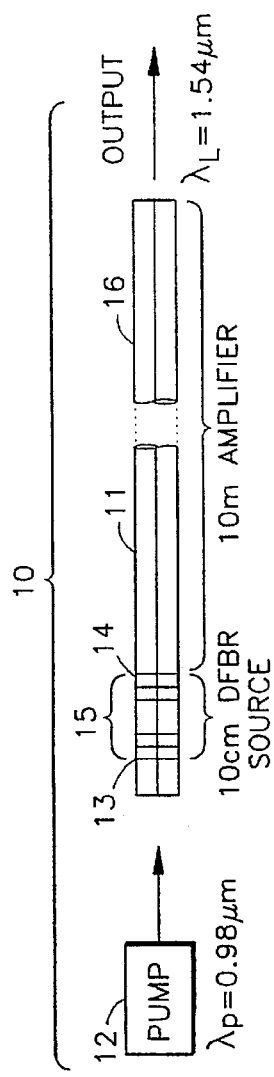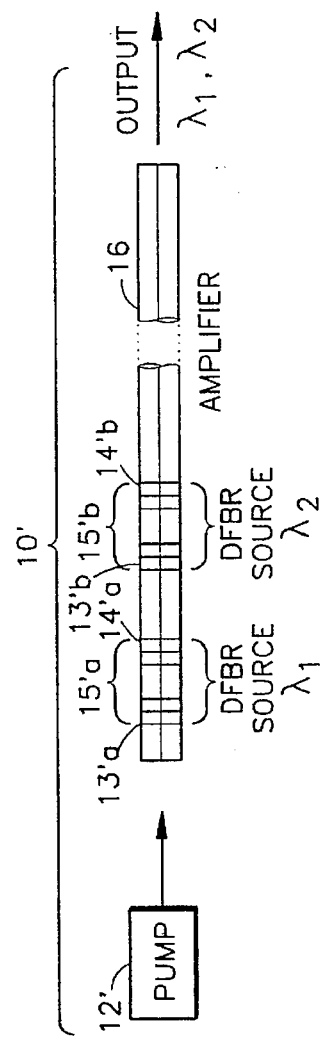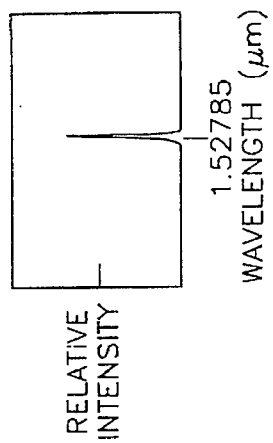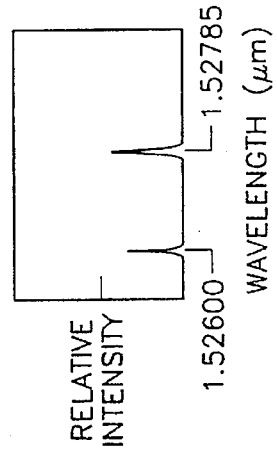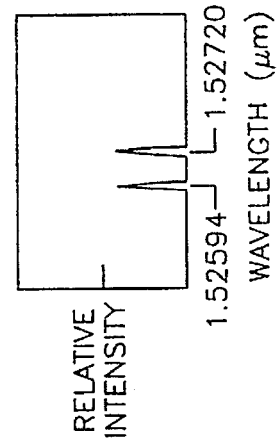

EMBEDDED BRAGG GRATING LASER MASTER-OSCILLATOR AND POWER-AMPLIFIER

CROSS-REFERENCE TO RELATED APPLICATIONS

The present application is a continuation-in-part of copending U.S. patent application Ser. No. 07/732,552, filed Jul. 19, 1991, which was a continuation-in-part of U.S. applications Ser. No. 07/457,118, filed Dec. 26, 1989, now abandoned.

TECHNICAL FIELD

The present invention relates to pumped optical waveguide lasers in general, and more particularly to lasers of the above type which utilize reflective elements constituted by Bragg gratings.

BACKGROUND ART

There are already known various constructions of pumped optical waveguide lasers, among them such utilizing fully or partially reflective coatings on the respective end faces delimiting the laser resonance cavities in the optical waveguides, and such using external mirrors to delimit the laser cavities. Even though these solutions have achieved quite a degree of success and/or acceptance in the laser manufacturing and utilization fields, they still suffer of certain drawbacks. An important disadvantage of such lasers that is particularly felt in the optical communication field is that, even when the optical fiber laser is constructed as a so-called single-mode optical fiber laser, it typically lases in a great number of longitudinal modes. This, of course, significantly degrades the properties of the laser radiation issued by the optical fiber laser due to mode beating and other optical effects, thus considerably reducing the utility of the issued laser beam.

Accordingly, it is a general object of the present invention to avoid the disadvantages of the prior art.

More particularly, it is an object of the present invention to provide a pumped optical fiber laser arrangement which does not possess the disadvantages of the known arrangements of this kind.

Still another object of the present invention is so to develop the arrangement of the type here under consideration as to improve its performance in terms of obtained output power, while simultaneously obtaining excellent mode discrimination.

It is yet another object of the present invention to devise arrangements of the above type which are able to achieve high conversion efficiencies with relatively short optical fiber lasers.

A concomitant object of the present invention is to design the optical fiber laser arrangement of the above type in such a manner as to be relatively simple in construction, inexpensive to manufacture, easy to use, and yet reliable in operation.

DISCLOSURE OF THE INVENTION

According to the present invention, a Master-Oscillator and Power-Amplifier (MOPA) includes an optical waveguide which receives and propagates pump light of a predetermined wavelength launched into the optical waveguide; a first master oscillator laser, disposed in the waveguide in the path of the pump light, the laser having a laser cavity disposed between a first pair of reflectors and having a first laser gain medium within the first laser cavity which emits first lasing light in response to the pump light, the first reflectors reflecting a predetermined mount of the first lasing light within the first laser cavity and passing a predetermined amount of the first lasing light as first output laser light from the first laser, the first reflectors passing the pump light through the first laser; at least one of the first reflectors comprises a Bragg grating; and an optical waveguide power amplifier, disposed in the path of the first output laser light and the pump light, and having a first amplifier gain medium therein which emits first amplified laser light in response to the pump light and the first output laser light.

According further to the present invention, a second master oscillator laser is disposed in the waveguide between the first laser and the amplifier, in the path of the pump light, the second laser having a second laser cavity disposed between a second pair of reflectors and having a second laser gain medium within the second laser cavity which emits second lasing light in response to the pump light, the second reflectors reflecting a predetermined amount of the second lasing light within the second laser cavity and passing a predetermined amount of the second lasing light as second output laser light from the second laser, the second reflectors passing the pump light and the first output laser light through the second laser; the first and the second output laser lights being at different wavelengths; at least one of the second reflectors comprises a Bragg grating; and the amplifier disposed in the path of the second output laser light and the pump light, and the amplifier gain medium emitting second amplified laser light in response to the pump light and the second output laser light.

According further to the present invention, the waveguide comprises an optical fiber.

According to another aspect of the present invention, a fiber laser, includes an optical fiber which receives and propagates pump light of a predetermined wavelength launched into the fiber; and a laser, disposed in the fiber in the path of the pump light, the laser having a laser cavity disposed between a pair of reflectors at least one of the reflectors comprising a Bragg grating and the laser having a laser gain medium within the laser cavity which emits lasing light in response to the pump light, the reflectors reflecting a predetermined amount of the lasing light within the laser cavity and passing a predetermined amount of the lasing light as output laser light from the laser.

According further to the other aspect of the invention, both of the reflectors comprise Bragg gratings.

BRIEF DESCRIPTION OF THE DRAWING

The present invention will be described in more detail below with reference to the accompanying drawing in which:

FIG. 1a is a somewhat simplified side elevational view of an optically pumped optical fiber laser/power amplifier arrangement of the present invention;

FIG. 1b is a view similar to that of FIG. 1a but showing a modified construction of the laser/amplifier arrangement; and FIGS. 2a to 2c are graphic representations of the behaviors of the laser sources of the arrangement of FIG. 1b under various operating conditions.

BEST MODE FOR CARRYING OUT THE INVENTION

Referring now to the drawing in detail, and first to FIG. 1a thereof, it may be seen that the reference numeral 10 has been used therein to identify a pumped optical fiber laser arrangement in its entirety. The arrangement 10 includes, as its main components, an optical fiber section 11 and a laser pump 12 which is of any known construction and advantageously is constituted by or includes a diode laser. The laser pump 12 issues light of a wavelength $\lambda_p$, and this light is launched, in any well known manner, into the optical fiber section 11 for propagation longitudinally thereof. As is well known to those practicing in this field, the optical fiber section 11 includes a fiber core and a cladding surrounding the core together forming an optical waveguide, with the stimulating light from the laser pump 12 being launched into and guided in the optical waveguide.

The optical fiber section 11 is shown to be provided, in the core thereof, with two gratings 13 and 14 which are spaced from one another in the longitudinal direction of the section 11 and are shown to be both situated close to one end of the section 11. The gratings 13 and 14 are reflective, to a greater or lesser degree, but only to light within a very narrow band around a central wavelength $\lambda_1$, being substantially transparent to light at all other wavelengths, including, at least as far as the grating 13 is concerned, the pumping wavelength $\lambda_p$. Thus, the gratings 13 and 14 act as reflectors for light of wavelength $\lambda_1$ and thus longitudinally delimit a laser cavity in which lasing takes place. The properties of the reflectors (distributed Bragg gratings) 13 and 14 and of the materials of the optical fiber section 11 are so chosen with respect to the laser cavity length that lasing takes place in only a single longitudinal mode, so that the gratings 13 and 14 and the region of the core of the optical fiber that is interposed therebetween together constitute a distributed fiber Bragg reflector laser source 15.

It is proposed in accordance with the present invention for the gratings 13 and 14 to be spaced from one another by only a relatively short distance, such as 10 cm, but to give the optical fiber section 11 a considerable length, such as on the order of 10 meters. While the conversion efficiency of the laser source 15 will still be relatively low because most of the pumping radiation will simply pass therethrough into a subsequent region 16 of a considerably greater length, the additional length of the fiber 16 will act as an amplifier that will convert the energy of the thus propagating pumping radiation into additional power of the laser beam coherent with the originally excited laser beam. Hence, the laser source 15 and the amplifier 16 together constitute a master-oscillator/power-amplifier (MOPA) device whose total energy conversion efficiency greatly exceeds that of the laser source 15 alone without bringing about the problems that could be present if the laser source 15 extended over substantially the entire (10 meter) length of the fiber section 11.

The gratings 13 and 14 are of the type, and are made in accordance with the method, disclosed in the commonly owned U.S. Pat. No. 4,807,805, the disclosure of which is incorporated herein by reference to the extent necessary to provide additional explanation of the type of the Bragg gratings that is particularly suited for use in the optical fiber laser arrangement 10. As more fully explained in the above patent, gratings of this type act as wavelength selective reflectors. An embedded grating of specified periodicity will partially or fully reflect a specific wavelength of an optical signal carried by the fiber section 11. This type of grating is incorporated or embedded in the core of an optical fiber by a method disclosed in the above patent. As discussed there, permanent periodic gratings of this kind can be provided or impressed in the core of an optical fiber by exposing the core through the cladding to the interference pattern of two compatible ultraviolet light beams that are directed against the optical fiber at two angles relative to the fiber axis that supplement each other to 180°. This results in a situation where the material of the fiber core has permanent periodic variations in its refractive index impressed therein by the action of the interfering ultraviolet light beams thereon, with the individual grating elements (i.e. the periodically repetitive regions of the core exhibiting the same refractive index behavior) being oriented normal to the fiber axis so as to constitute a Bragg grating. The embedded Bragg grating of this kind reflects, of the light launched into or otherwise guidedly propagating in the fiber core in a propagation direction that brings it to the respective grating 13 or 14, only that having a wavelength within a very narrow range around a central wavelength $\lambda_2$ that is dependent on the grating element periodicity, back along the fiber axis opposite to the original propagation direction while being substantially transparent to light at wavelengths outside the aforementioned narrow band so that it does not adversely affect the passage of such other light therethrough. In effect, this type of grating creates a narrow notch in the transmission spectrum and, by the same token, a similarly narrow peak in the reflection spectrum. This reflection spectrum peak is being utilized in accordance with the present invention to determine the lasing wavelength $\lambda_1$, and the axial length of each of the gratings 13 and 14 is selected in such a manner as to obtain the desired reflectivities at the gratings 13 and 14, respectively.

For the optical fiber section 11 to operate as the aforementioned succession of an optically pumped laser 15 and the amplifier 16 (MOPA), the material of at least the core of the section 11 is to contain at least one dopant of the type exhibiting gain when optically pumped, for instance a rare-earth element, such as neodymium or erbium. This dopant is present not only throughout the laser 15 proper but also throughout the amplifier 16. On the other hand, the above patent teaches the making of the gratings of the type here under consideration in germanium doped optical fiber cores. To obtain an optically pumped laser 15 in accordance with the present invention, it is currently preferred to impress the gratings 13 and 14 directly into the (rare-earth doped) active material of the optical fiber section 11 (or its core), in which case at least the regions of the active material that are to be provided with the gratings 13 and 14 are doped with germanium as well. However, it would also be possible to form such gratings 13 and 14 in optical fiber pieces (or cores thereof) of a germanium-doped passive material, and to splice the same with an optical fiber piece made of, or having a core of, the rare-earth doped active material, to thus obtain the optical fiber section 11. It is also contemplated to make the pumped laser 15 separately from the amplifier 16 and to splice them together. In either event, the optical fiber section 11 is unitary or integral, so that no problems arising from the presence of optical discontinuities are encountered.

Turning now to FIG. 1b of the drawing, in which the same reference numerals as before but supplemented with primes and/or reference characters have been used to denote corresponding parts, it may be seen that it depicts a modified construction of the laser arrangement 10' in which the optical fiber section 11' includes not one, but two consecutively arranged pumped lasers 15'a and 15'b delimited by respective Bragg gratings 13'a and 14'a and 13'b and 14'b, respectively. The laser 15'a is still tuned to the wavelength $\lambda_1$, but the laser 15'b is configured to operate at a different wavelength $\lambda_2$. Now, each of the lasers 15'a and 15'b will issue at least a part of its output into the amplifier region 16' where it will be further amplified by conversion of the energy of the pumping radiation. It is to be noted that the wavelength $\lambda_1$ is sufficiently spaced from the wavelength $\lambda_2$ for the gratings 13'b and 14'b to be virtually transparent to the output light of the laser 15'a, and vice versa. Consequently, the two lasers 15'a and 15'b can operate independently from one another and be modulated with information (by separately tuning the lasers 15'a and 15'b to different frequencies within their respective operating ranges, without longitudinal mode hopping).

Initial demonstration of the MOPA 15, 16 of the type illustrated in FIG. 1a of the drawing was performed using a 10 cm source 15 in a 10 meter long section 11 of commercially available germanosilicate fiber. This fiber section 11 was doped with erbium at about 400 ppm, had a cutoff wavelength of 1.02 µm, and a numerical aperture (N.A.) of 0.24. The source 15 was characterized to run in a single longitudinal mode both with and without the amplifier 16. With the power amplifier 16 providing an approximate gain of 29 dB, an output power of 25 mW was obtained from the MOPA 15, 16 of this type.

A second demonstration was conducted using a wavelength multiplexed MOPA corresponding to that illustrated in FIG. 1b of the drawing. This MOPA included the two aforementioned sources 15'a and 15'b arranged in tandem, each being of about 10 cm in length, while the section 11 had a total length of about 10 meters. The sources 15'a and 15'b were designed and constructed in such a manner that the wavelength separation between them amounted to about 1.25 nm. Both sources 15'a and 15'b lased simultaneously, resulting in the situation depicted in FIG. 2a of the drawing. FIG. 2b shows the change in the wavelength of one of the sources 15'a and 15'b due to longitudinal stretching of the respective grating pair. The shift in the laser wavelength on stretching the fiber corresponds to $\delta\lambda=1.13\times10^3\epsilon$, wherein $\epsilon$ is the strain applied to the fiber under tension. As shown in FIG. 2c, when only one of the gratings, such as 13'b and 14'b, of the respective pair is stretched with attendant spoiling of the cavity Q, the intensity of the laser beam of the corresponding laser source 15'b may be reduced to below the lasing threshold so that the laser source 15'b will cease to issue laser light at its characteristic frequency. This, in turn, means that all of the additional amplifier energy is allotted to the output of the other laser source 15'a so that the fiber section 11' behaves almost if not entirely identically to the section 11, that is, as if the laser source 15'b were absent. This phenomenon can be advantageously used for achieving broadband tuning of the laser output wavelength without mode hopping over a much broader range than either one of the lasers 15'a and 15'b (and possible additional lasers) would be capable of being tuned in. To this end, the central reflection wavelengths of such lasers are staggered without overlapping each other, and the lasers are activated in succession while the previously active lasers are de-activated by spoiling the cavity Q.

While the present invention has been illustrated and described as embodied in a particular construction of an embedded grating laser arrangement, it will be appreciated that such invention is not limited to this particular example; rather, the scope of protection thereof is to be determined solely from the attached claims.

We claim:

1. A Master-Oscillator and Power-Amplifier, comprising:
    an optical waveguide which receives and propagates pump light of a predetermined wavelength launched into said optical waveguide;
    a first master oscillator laser, disposed in said waveguide in the path of said pump light, said laser having a laser cavity disposed between a first pair of reflectors and having a first laser gain medium within said first laser cavity which emits first lasing light in response to said pump light, said first reflectors reflecting a predetermined amount of said first lasing light within said first laser cavity and passing a predetermined amount of said first lasing light as first output laser light from said first laser, said first reflectors passing said pump light through said first laser;
    at least one of said first reflectors comprises a Bragg grating; and
    an optical waveguide power amplifier, disposed in the path of said first output laser light and said pump light, and having a first amplifier gain medium therein which emits first amplified laser light in response to said pump light and said first output laser light.

2. The apparatus of claim 1 further comprising:
    a second master oscillator laser, disposed in said waveguide between said first laser and said amplifier, in the path of said pump light, said second laser having a second laser cavity disposed between a second pair of reflectors and having a second laser gain medium within said second laser cavity which emits second lasing light in response to said pump light, said second reflectors reflecting a predetermined amount of said second lasing light within said second laser cavity and passing a predetermined amount of said second fusing light as second output laser light from said second laser, said second reflectors passing said pump light and said first output laser light through said second laser;
    said first and said second output laser lights being at different wavelengths;
    at least one of said second reflectors comprises a Bragg grating; and
    said amplifier disposed in the path of said second output laser light and said pump light, and said amplifier gain medium emitting second amplified laser light in response to said pump light and said second output laser light.

3. The apparatus of claim 2 wherein said first laser, said second laser, and said amplifier are all disposed in a common waveguide.

4. The apparatus of claim 3 wherein said common waveguide comprises an optical fiber.

5. The apparatus of claim 1 wherein said first laser and said amplifier are disposed in a common waveguide.

6. The apparatus of claim 5 wherein said common waveguide comprises an optical fiber.

7. The apparatus of claim 1 wherein said waveguide comprises an optical fiber.

8. A fiber laser, comprising:
    an optical fiber which receives and propagates pump light of a predetermined wavelength launched into said fiber; and
    a laser, disposed in said fiber in the path of said pump light, said laser having a laser cavity disposed between a pair of reflectors at least one of said reflectors comprising a Bragg grating and said laser having a laser gain medium within said laser cavity which emits lasing light in response to said pump light, said reflectors reflecting a predetermined amount of said lasing light within said laser cavity and passing a predetermined amount of said lasing light as output laser light from said laser.

9. The fiber laser of claim 8 wherein both of said reflectors comprise Bragg gratings.

* * * * *

UNITED STATES PATENT AND TRADEMARK OFFICE
CERTIFICATE OF CORRECTION

PATENT NO : 5,666,372

DATED : September 9, 1997

INVENTOR(S): Gary A. Ball & William H. Glenn

It is certified that error appears in the above-identified patent and that said Letters Patent is hereby corrected as shown below:

On the Title Page, line 12 of the Abstract, "fusing" should read --lasing--.

Column 2, line 4, "mount" should read --amount--.

Column 6, Claim 2, line 26, "fusing" should read --lasing--.

Signed and Sealed this

Sixteenth Day of June, 1998

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,666,372  
DATED : September 9, 1997  
INVENTOR(S) : Gary A. Ball and William H. Glenn Page 1 of 1

It is certified that error appears in the above-identified patent and that said Letters Patent is hereby corrected as shown below:

<u>Title page,</u>  
Insert Item: -- [*] Notice: This patent is subject to a terminal disclaimer. --

Signed and Sealed this

Twenty-sixth Day of July, 2005

JON W. DUDAS  
*Director of the United States Patent and Trademark Office*